(12) United States Patent
Bahceci et al.

(10) Patent No.: US 9,397,775 B2
(45) Date of Patent: Jul. 19, 2016

(54) FREQUENCY DIVISION DUPLEXING AND HALF DUPLEX FREQUENCY DIVISION DUPLEXING IN MULTIHOP RELAY NETWORKS

(75) Inventors: Israfil Bahceci, Nepean (CA); Nimal Senerath, Nepean (CA); Hang Zhang, Nepean (CA); Peiying Zhu, Kanata (CA); Derek Yu, Kanata (CA); Wen Tong, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 151 days.

(21) Appl. No.: 12/875,516

(22) Filed: Sep. 3, 2010

(65) Prior Publication Data

US 2011/0188443 A1 Aug. 4, 2011

Related U.S. Application Data

(63) Continuation-in-part of application No. 12/806,204, filed on Sep. 3, 2009, now abandoned.

(60) Provisional application No. 61/096,495, filed on Sep. 12, 2008.

(51) Int. Cl.
*H04W 88/04* (2009.01)
*H04J 3/08* (2006.01)

(52) U.S. Cl.
CPC .......................................... *H04J 3/08* (2013.01)

(58) Field of Classification Search
CPC ..... H04W 88/04; H04W 80/04; H04W 84/12; H04W 88/06; H04L 5/0007
USPC ......... 370/315, 327, 328, 329, 336, 337, 343, 370/344, 345, 347, 208; 375/260; 455/11.1
See application file for complete search history.

(56) References Cited

U.S. PATENT DOCUMENTS

| 2007/0036071 | A1* | 2/2007 | Herdin ........................... 370/210 |
| 2007/0115802 | A1* | 5/2007 | Yu et al. ......................... 370/208 |

(Continued)

OTHER PUBLICATIONS

International Search Report mailed Jan. 13, 2011 in relation to PCT Application No. PCT/CA2010/001351 filed Sep. 3, 2010.

(Continued)

*Primary Examiner* — Andrew Lee
(74) *Attorney, Agent, or Firm* — Fish & Richardson P.C.

(57) ABSTRACT

In methods of operating a relay station in a multi-hop wireless relay network, the relay station in communication with a superordinate station and a subordinate station, a downlink transmission to/from the superordinate station is transmitted/received at a first frequency. An uplink transmission to/from the subordinate station is transmitted/received at a second frequency. Communications between the relay station and the superordinate station may be scheduled using frames, each frame including a downlink portion at the first frequency, and an uplink portion at the second frequency. The downlink portion includes first and second downlink subframes for communication between the superordinate station and first and second pluralities of stations, respectively. The uplink portion includes first and second uplink subframes for communication between the superordinate station and the first and second pluralities of stations, respectively. The downlink transmission occurs in the first downlink subframe, and the uplink transmission occurs in the first uplink subframe.

18 Claims, 22 Drawing Sheets

(56) References Cited

U.S. PATENT DOCUMENTS

| | | | |
|---|---|---|---|
| 2008/0186899 A1* | 8/2008 | Zhu et al. | 370/315 |
| 2008/0212506 A1* | 9/2008 | Lee et al. | 370/310 |
| 2009/0274086 A1* | 11/2009 | Petrovic et al. | 370/312 |
| 2010/0232546 A1* | 9/2010 | Yu et al. | 375/300 |
| 2010/0278123 A1 | 11/2010 | Fong et al. | |

OTHER PUBLICATIONS

Written Opinion mailed Jan. 13, 2011 in relation to PCT Application No. PCT/CA2010/001351 filed Sep. 3, 2010.
Schoenen, R. et al., "Concurrent Operation of Half- and Full-Duplex Terminals in Future Mutli-Hop FDD Based Cellular Networks", WiCOM '08, 4th International Conference on Wireless Communications, Networking and Mobile Computing, IEEE.
Panasonic, "Discussion on the TD relay and FD relay for FDD system", Document No. R1-084232, 3GPP TSG RAN WG1 Meeting #55, Prague, Czech Republic, Nov. 10-14, 2008 [online]. [Retrieved on Dec. 9, 2010 from http://www.3gpp.org/ftp/tsg_ran/wg1_r11/TSGR1_55/Docs/>.
Peters, S.W. et al, "The Future of WiMAX: Multihop Relaying with IEEE 802.16j", IEEE Communications Magazine, vol. 47, Issues 1, Jan. 2009.
International Preliminary Report on Patentability issued in International Application No. PCT/CA2010/001351 on Mar. 6, 2012; 8 pages.
Office Action issued in U.S. Appl. No. 13/617,629 on May 20, 2013; 27 pages.
Comstock et al.; "A Flexible Multi-hop Frame Structure for IEEE 802.16j"; IEEE 802.16 Broadband Wireless Access Working Group; Nov. 7, 2006; 11 pages <http://ieee802.org/16>.
Hart et al.; "Frame Structure for Support of Multihop Relaying"; IEEE 802.16 Broadband Wireless Access Working Group; Jan. 8, 2007; 7 pages. <http://ieee802.org/16>.
Senarath et al.; "FDD and H-FDD Frame Structure for Transparent RS and MR-BS"; IEEE 802.16 Broadband Wireless Access Working Group; Nov. 12, 2008; 3 pages. <http://ieee802.org/16>.
Senarath et al.; "FDD and H-FDD Frame Structure for TTR RS and MR-BS"; IEEE 802.16 Broadband Wireless Access Working Group; Nov. 12, 2008; 5 pages. <http://ieee802.org/16>.
Office Action issued in Japanese Application No. 2012-527164 on Jan. 8, 2014; 4 pages—no translation.
Japanese Pre-Appeal Examination Report in Japanese Application No. 2012-527164, dated Jan. 8, 2015, 8 pages.
Senarath et al., "FDD and H-FDD mode for IEEE 802.16j Multihop Relay Networks," IEEE 802.16 Broadband Wireless Access Working Group, Sep. 15, 2008, 9 pages.
Genc, Vasken et al.; "IEEE 802.16j Relay-Based Wireless Access Networks: An Overview"; IEEE Wireless Communications; vol. 15, Issue 5; pp. 56-63; 2008.
Office Action issued in Japanese Application No. 2012-527164 on Jul. 23, 2014; 10 pages.
Office Action issued in Chinese Application No. 201080049650.5 on Jul. 3, 2014; 7 pages.
"IEEE Standard for Local and Metropolitan Area Networks—Part 16: Air Interface for Broadband Wireless Access Systems, Amendment 1 : Multihop Relay Specification"; Annex 2 IEEE 802.16j IEEE Computer Society and the IEEE Microwave Theory and Techniques Society; Jun. 12, 2009; 315 pages.

* cited by examiner

FREQUENCY DIVISION DUPLEXING AND HALF DUPLEX FREQUENCY DIVISION DUPLEXING IN MULTIHOP RELAY NETWORKS

RELATED APPLICATIONS

This application claims the benefit of U.S. Provisional Patent Application No. 61/239,514, filed in the United States Patent Office on Sep. 3, 2009, the contents of which are incorporated by reference herein.

This application is a continuation-in-part of the non-provisional application (Ser. No. 12/806,204) resulting from conversion under 37 C.F.R. §1.53(c)(3) of U.S. Provisional Patent Application No. 61/239,514, filed on Sep. 3, 2009, which claims the benefit of U.S. Provisional Patent Application No. 61/096,495, filed on Sep. 12, 2008.

FIELD OF THE INVENTION

The present invention relates to wireless communications and more particularly to a method and system for providing frequency division duplexing ("FDD") and half-duplex frequency division duplexing ("H-FDD") support in multihop relay networks.

BACKGROUND

Wireless communication networks, such as cellular networks, operate by sharing resources among mobile terminals operating in the communication network. As part of the sharing process, resources are allocated by one or more controlling devices within the system. Certain types of wireless communication networks are used to support cell-based high speed services such as those under the family of IEEE 802.16 standards. The IEEE 802.16 standards are often referred to as WiMAX or less commonly as WirelessMAN or the Air interface Standard. Another emerging standard that has not yet been ratified is referred to as Long Term Evolution (LTE). Other wireless networking technologies include Third Generation (3G), Third Generation Partnership Project (3GPP), and 802.11, popularly known as WiFi.

More specifically, IEEE 802.16e extends the 2004 version of IEEE 802.16 for fixed Broadband Wireless Access so as to support the mobility of users and provide Quality of Service (QoS) guarantees to enable multimedia services. From a system-level perspective, an IEEE 802.16e cell includes a number of Mobile Stations (MSs) served by a Base Station (BS), which controls the access to the wireless medium in a centralized manner. Before transmitting to (or receiving from) the BS, a MS must request the admission of a new connection. If accepted, the BS is then responsible for meeting the requested QoS guarantees.

The shared wireless medium demands co-ordinated transmission of multiple traffic flows over it. Duplexing refers to the way two-way communication is carried on the transmission medium. There are two commonly used duplexing techniques: Time Division Duplex (TDD), and Frequency Division Duplex (FDD). In TDD, the DL and UL traffic is typically transmitted on the same carrier frequency at different times. The time allocations for the DL and UL portions can be adaptive, which makes it suitable for asymmetric connections. In FDD, the UL and DL traffic is transmitted on different carrier frequencies, and may thus be transmitted/received simultaneously. An FDD hybrid known as Half-duplex Frequency Division Duplex (H-FDD), adds the restriction that a terminal cannot transmit and receive at the same time. H-FDD is cheaper to implement and less complex than full-duplex FDD, though the system throughput is lower.

Access to the shared wireless medium is scheduled using Orthogonal Frequency-Division Multiple Access (OFDMA) frames that extend over two dimensions: time, in units of OFDMA symbols, and frequency, in units of logical subchannels. Data bursts are conveyed into two-dimensional (i.e. time and frequency) data regions, which identify regions within the frame and are advertised by the BS via specific control messages. Each frame is divided into downlink (DL) and uplink (UL) subframes. The former is used by the BS to transmit data to the MSs, whereas the MSs transmit to the BS in the latter.

FIG. 12 shows an example TDD frame structure. As shown, a DL subframe starts with a preamble followed by a Frame Control Header (FCH), a downlink MAP (DL-MAP), and an uplink MAP (UL-MAP). The preamble helps MSs perform synchronization and channel estimation. The FCH specifies a burst profile and the length of one or more downlink bursts that immediately follow the FCH in the current frame. The DL-MAP and UL-MAP notify MSs of the corresponding resources allocated to them in the downlink and uplink direction, respectively, within the current frame. In general, the BS is free to define the shape and position of any data region. Based upon the schedule received from the BS, each MS can determine when (i.e., OFDMA symbols) and where (i.e., subchannels) it should receive from and transmit to the BS. Proper time gaps, namely receive-to-transmit transition gap (RTG) and transmit-to-receive transition gap (TTG, also referred to herein as TRG), have to be inserted between consecutive subframes in order to give wireless devices sufficient time to switch from transmission mode to reception mode, or vice versa.

FIG. 13 shows an example FDD frame structure. IEEE 802.16 specifies that BSs of FDD systems shall operate in full-duplex mode, while MSs shall be either full-duplex (FDD) or half-duplex (H-FDD). The FDD frame structure shown in FIG. 13 supports the concurrent operation of H-FDD and FDD MSs. The frame structure supports a coordinated transmission arrangement of two groups of H-FDD MSs (Group-1 and Group-2) that share the frame at distinct partitions of the frame. As shown, the DL frame contains two subframes. DL Subframe 1 comprises a preamble region, a MAP region (MAP1) and a data region (DL1). DL Subframe 2 comprises a MAP region (MAP2) and a data region (DL2). Similarly, the UL frame contains two subframes, UL2 and UL1. FIG. 13 shows the timing relationship of the UL subframes relative to the DL subframes. The four parameters TTG1, TTG2, RTG1 and RTG2 are sufficiently large to accommodate the H-FDD MSs transmit receive switching time plus the round trip propagation delay. Group-1 H-FDD MSs listen to DL Subframe 1 and transmit in uplink subframe UL1. Group-2 H-FDD MSs listen to DL Subframe 2 and transmit in uplink subframe UL2. The MAP regions—MAP1 and MAP2—are independent and include FCH, DL-MAP and UL-MAP.

IEEE 802.16j adds multihop relay capabilities to IEEE 802.16 systems. Relay-based systems typically comprise low-cost relays, which are associated with specific base stations (BSs). The relays can be used to extend the coverage area of a BS and/or increase the capacity of a wireless access system. The relays can repeat transmissions to/from the BS so that MSs within communication range of a relay can communicate with the BS through the relay. The relays do not need a backhaul link because they communicate wirelessly with both BSs and MSs. This type of network may be referred to as a multihop network because there may be more than one wireless connection between the MS and a hardwired connection. Depending upon the particular network configuration, a particular MS may gain network access via one or more neighbour relays and/or one or more neighbour BSs. In addition, relays themselves might have one or more available path options to connect to a particular BS. IEEE 802.16j requires that from the perspective of the MS any communications with a Multihop Relay Base Station (MR-BS) which are relayed through a Relay Station (RS) appear to be the same as if they had come directly from the BS. The radio link between a MR-BS or RS and an MS is called an access link, while the link between a MR-BS and an RS or between a pair of RSs is called a relay link.

IEEE 802.16j defines two different RS modes of operation: transparent and non-transparent. A Transparent RS (T-RS) does not transmit control information such as preamble, FCH, and MAP. An MS connected to a T-RS receives control information directly from the MR-BS, and the T-RS relays only data traffic. A Non-Transparent RS (NT-RS) transmits a preamble and other broadcast messages and relays data traffic as well.

IEEE 802.16j specifies a TDD frame that is divided into DL and UL subframes, much like the IEEE 802.16 TDD frame structure shown in FIG. 12. However, IEEE 802.16j subframes are further divided into zones to support BS-RS communications and RS-MS communications in addition to BS-MS communications. In both transparent and non-transparent modes, so-called "access zones" are defined that support BS/NT-RS communications with the MS/T-RS. In the transparent mode a so-called "transparent zone" is defined for T-RS communications with the MS. In non-transparent mode "relay zones" are defined for BS/NT-RS communications with NT-RS. FIG. 14 shows an example configuration for a T-RS frame structure. FIG. 15 shows an example configuration for a T-RS frame structure in which MR-BS and RS have partitioned the UL subframe in the frequency domain. FIG. 16 shows an example of a minimum configuration for a NT-RS frame structure. FIG. 17 shows an example of configuration for NT-RS frame structure where MR-BS and RS have partitioned the UL subframe in the frequency domain.

Presently, the available standards for relay operation such as the IEEE 802.16j standard support only a TDD frame structure, and therefore, only the TDD mode of operation. However, systems such as WiMax, IEEE 802.16e and LTE support FDD, H-FDD and TDD capable mobile terminals.

A need exists for FDD and H-FDD support in multihop relay networks such that the coverage and other performance enhancements of relay systems can be extended to the FDD-based systems.

SUMMARY OF THE INVENTION

In accordance with an aspect of the present invention, there is provided a method of operating a relay station in a multihop wireless relay network, where the relay station is in communication with a superordinate station and a subordinate station. The method comprises: receiving a downlink transmission from the superordinate station at a first carrier frequency; receiving an uplink transmission from the subordinate station at a second carrier frequency; transmitting a downlink transmission to the subordinate station at the first carrier frequency; and transmitting an uplink transmission to the superordinate station at the second carrier frequency. The communication between the relay station and the superordinate station may be scheduled using frames, where each frame comprises: a downlink portion at the first carrier frequency, the downlink portion comprising a first downlink subframe for communication between the superordinate station and a first plurality of stations, and a second downlink subframe for communication between the superordinate station and a second plurality of stations; and an uplink portion at the second carrier frequency, the uplink portion comprising a first uplink subframe for communication between the superordinate station and the first plurality of stations, and a second uplink subframe for communication between the superordinate station and the second plurality of stations. The first downlink subframe may correspond with a first time interval, and the first uplink subframe may correspond with a second time interval, where the first time interval and the second time interval do not overlap. The relay station may be one of the first plurality of stations, whereby the receiving the downlink transmission occurs in the first downlink subframe, and the transmitting the uplink transmission occurs in the first uplink subframe.

In accordance with a further aspect of the present invention, there is provided a multihop relay system comprising a relay station in communication with a superordinate station and a subordinate station. The relay station comprises: receive circuitry for receiving a downlink transmission from said superordinate station at a first carrier frequency, and for receiving an uplink transmission from said subordinate station at a second carrier frequency; and transmit circuitry for transmitting a downlink transmission to said subordinate station at said first carrier frequency, and for transmitting an uplink transmission to said superordinate station at said second carrier frequency. The communication between the relay station and the superordinate station may be scheduled using frames, where each frame comprises: a downlink portion at the first carrier frequency, the downlink portion comprising a first downlink subframe for communication between the superordinate station and a first plurality of stations, and a second downlink subframe for communication between the superordinate station and a second plurality of stations; and an uplink portion at the second carrier frequency, the uplink portion comprising a first uplink subframe for communication between the superordinate station and the first plurality of stations, and a second uplink subframe for communication between the superordinate station and the second plurality of stations. The first downlink subframe may correspond with a first time interval, and the first uplink subframe may correspond with a second time interval, where the first time interval and the second time interval do not overlap. The relay station may be one of the first plurality of stations, whereby the receiving the downlink transmission occurs in the first downlink subframe, and the transmitting the uplink transmission occurs in the first uplink subframe.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate embodiments of the invention by example only.

DETAILED DESCRIPTION

Figure 1:
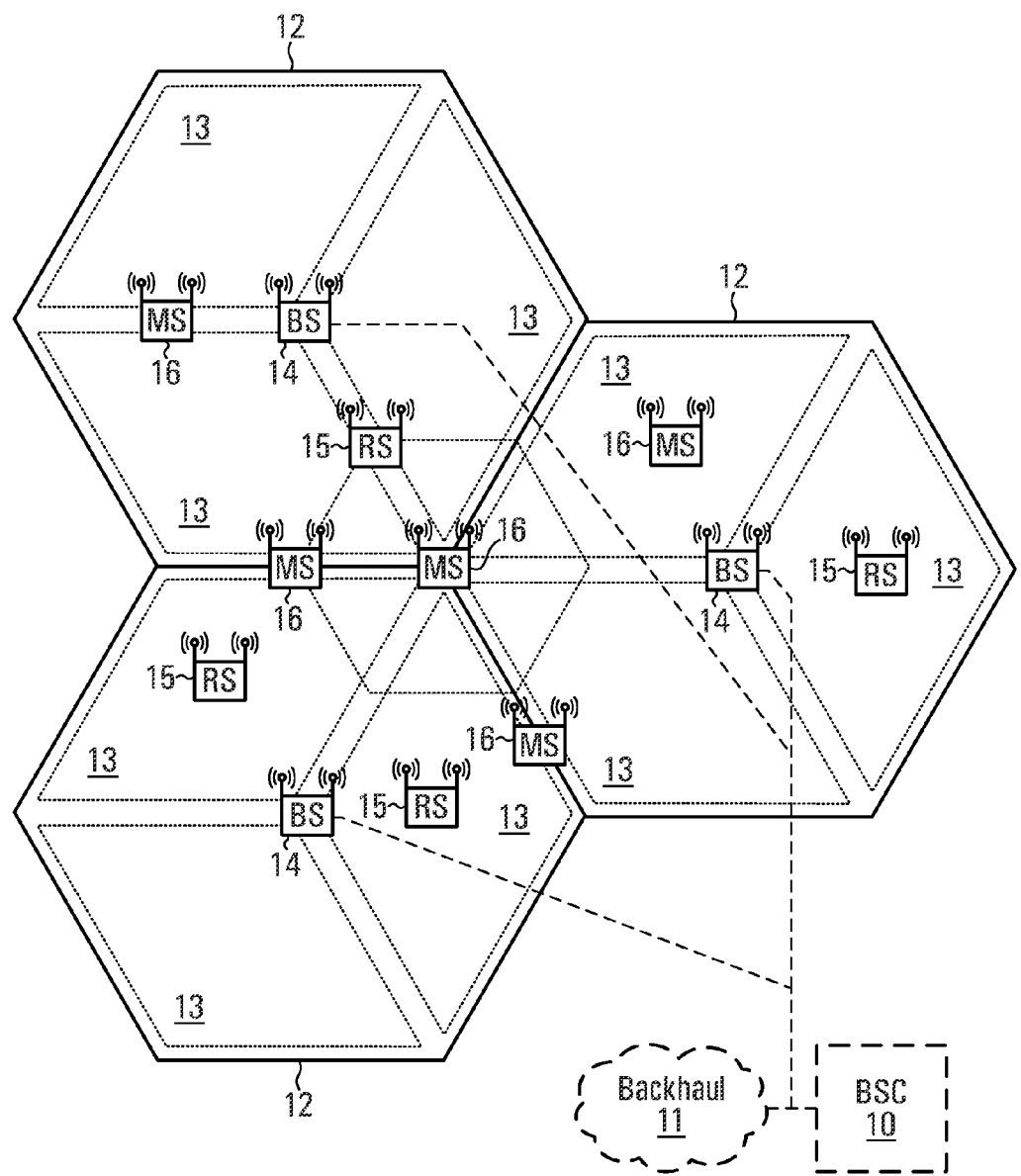
FIG. 1 is a block diagram of a cellular communication system.

Referring now to the drawing figures in which like reference designators refer to like elements, FIG. 1 shows a base station controller (BSC) 10 which controls wireless communications within multiple cells 12, which cells are served by corresponding base stations (BS) 14. In some configurations, each cell is further divided into multiple sectors 13 (not shown). In general, each base station 14 facilitates communications using OFDM with mobile terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. As described in more detail below, relay stations 15 may assist in communications between base stations 14 and mobile terminals 16. Mobile terminals 16 can be handed off 18 from any cell 12, sector 13 (not shown), base station 14 or relay 15 to an other cell 12, sector 13 (not shown), base station 14 or relay 15. In some configurations, base stations 14 communicate with each and with another network (such as a core network or the internet, both not shown) over a backhaul network 11. In some configurations, a base station controller 10 is not needed.

Figure 2:
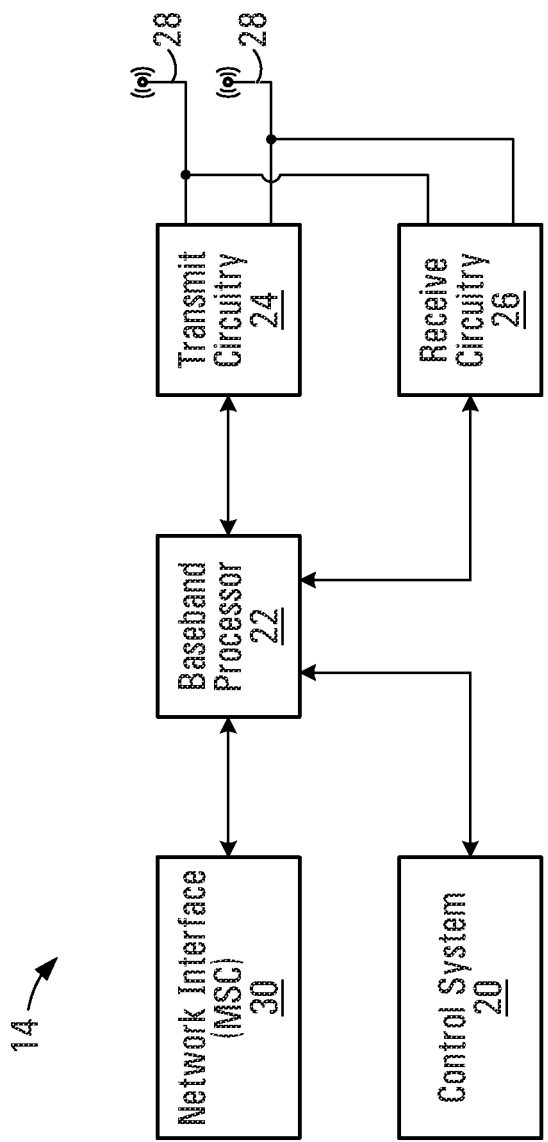
FIG. 2 is a block diagram of an example base station that might be used to implement some embodiments of the present application.

FIG. 2 depicts an example of a base station 14. Base station 14 generally includes a control system 20, a baseband processor 22, transmit circuitry 24, receive circuitry 26, antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
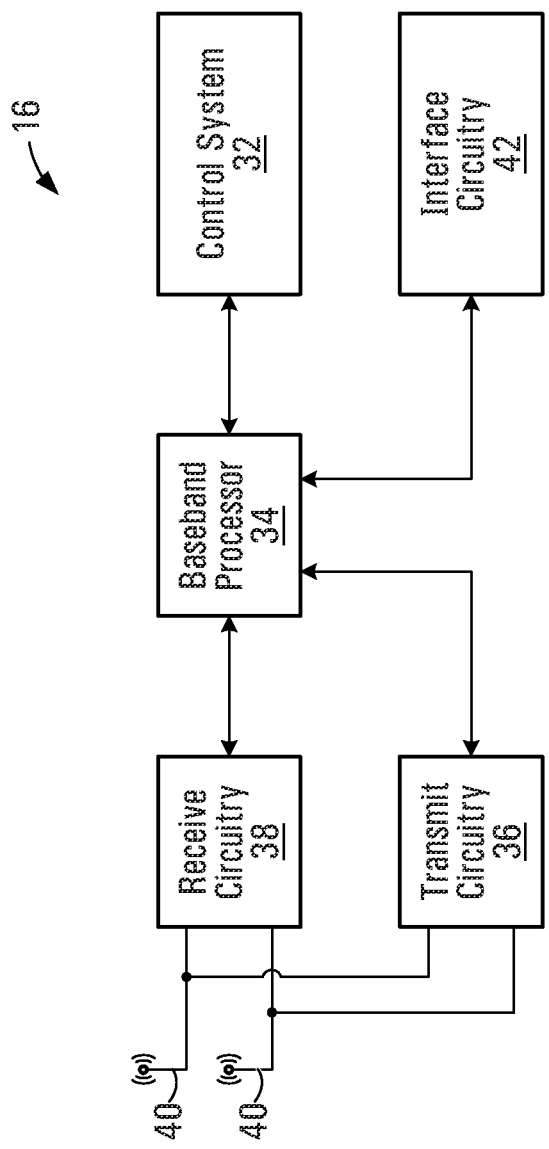
FIG. 3 is a block diagram of an example mobile terminal that might be used to implement some embodiments of the present application.

FIG. 3 illustrates an example of a mobile terminal 16. Similarly to the base station 14, the mobile terminal 16 will include a control system 32, a baseband processor 34, transmit circuitry 36, receive circuitry 38, antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

Baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In one embodiment, OFDM is preferably used for at least downlink transmission from the base stations 14 to the mobile terminals 16. Each base station 14 is equipped with "n" transmit antennas 28 (n>=1), and each mobile terminal 16 is equipped with "m" receive antennas 40 (m>=1). Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 4:
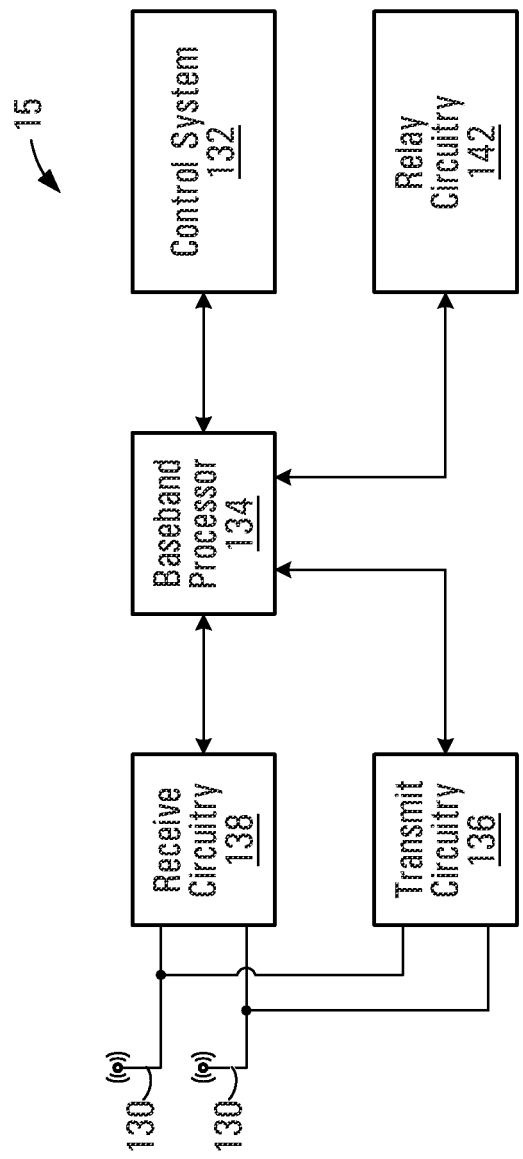
FIG. 4 is a block diagram of an example relay station that might be used to implement some embodiments of the present application.

FIG. 4 illustrates an example relay station 15. Similarly to the base station 14, and the mobile terminal 16, the relay station 15 includes a control system 132, a baseband processor 134, transmit circuitry 136, receive circuitry 138, antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

Baseband processor 134 processes the digitized received signal to extract the information or data bits conveyed in the received signal. This processing typically comprises demodulation, decoding, and error correction operations. Baseband processor 134 is generally implemented in one or more digital signal processors (DSPs) and application specific integrated circuits (ASICs).

For transmission, baseband processor 134 receives digitized data, which may represent voice, video, data, or control information, from control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
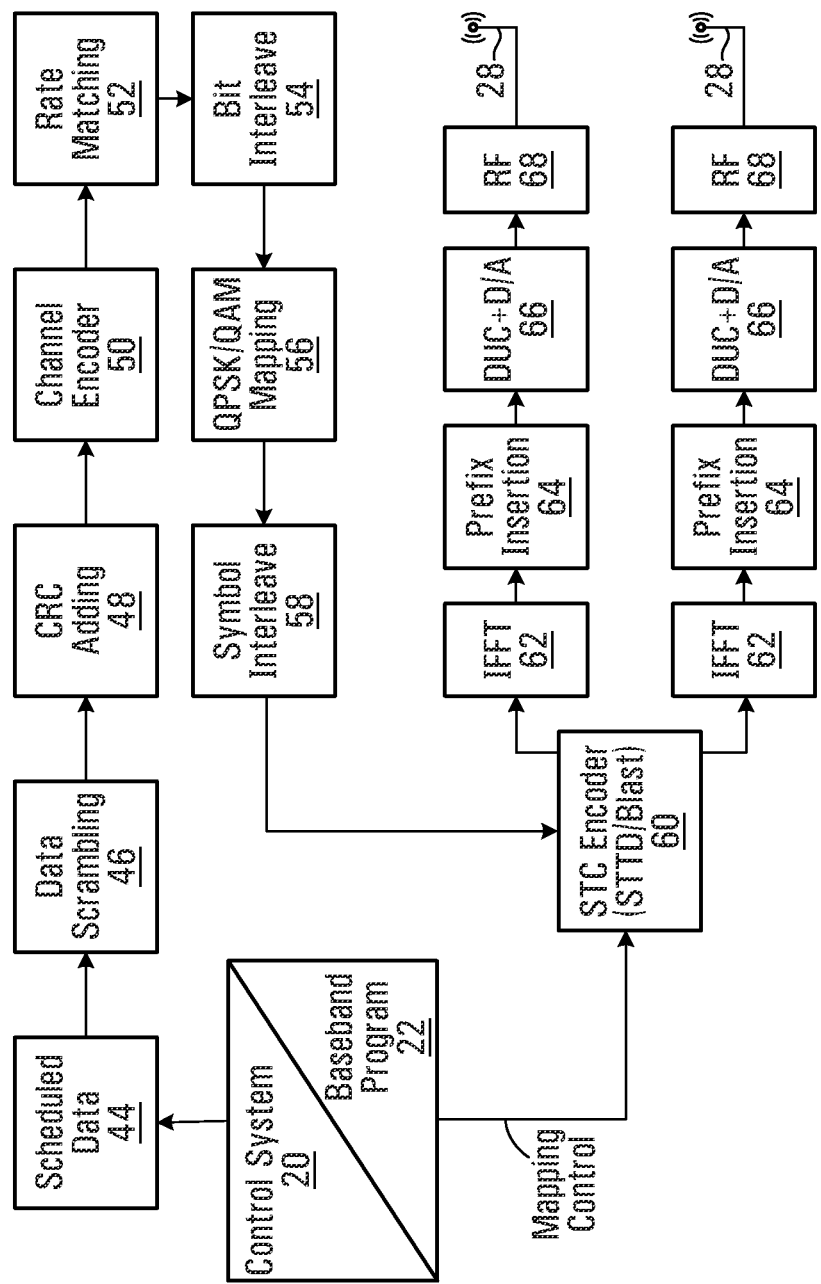
FIG. 5 is a block diagram of a logical breakdown of an example OFDM transmitter architecture that might be used to implement some embodiments of the present application.

With reference to FIG. 5, a logical OFDM transmission architecture will be described. Initially, base station controller 10 will send data to be transmitted to various mobile terminals 16 to base station 14, either directly or with the assistance of a relay station 15. Base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with reference to FIG. 5 will provide a mapping control signal to control STC encoding. At this point, assume the symbols for the "n"

outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the two symbol streams output by the SIC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the TUFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUG) and digital-to-analog (DIA) conversion circuitry 66. The resultant (analog) signals are then simultaneously modulated at the desired RF frequency, amplified, and transmitted via the RE circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
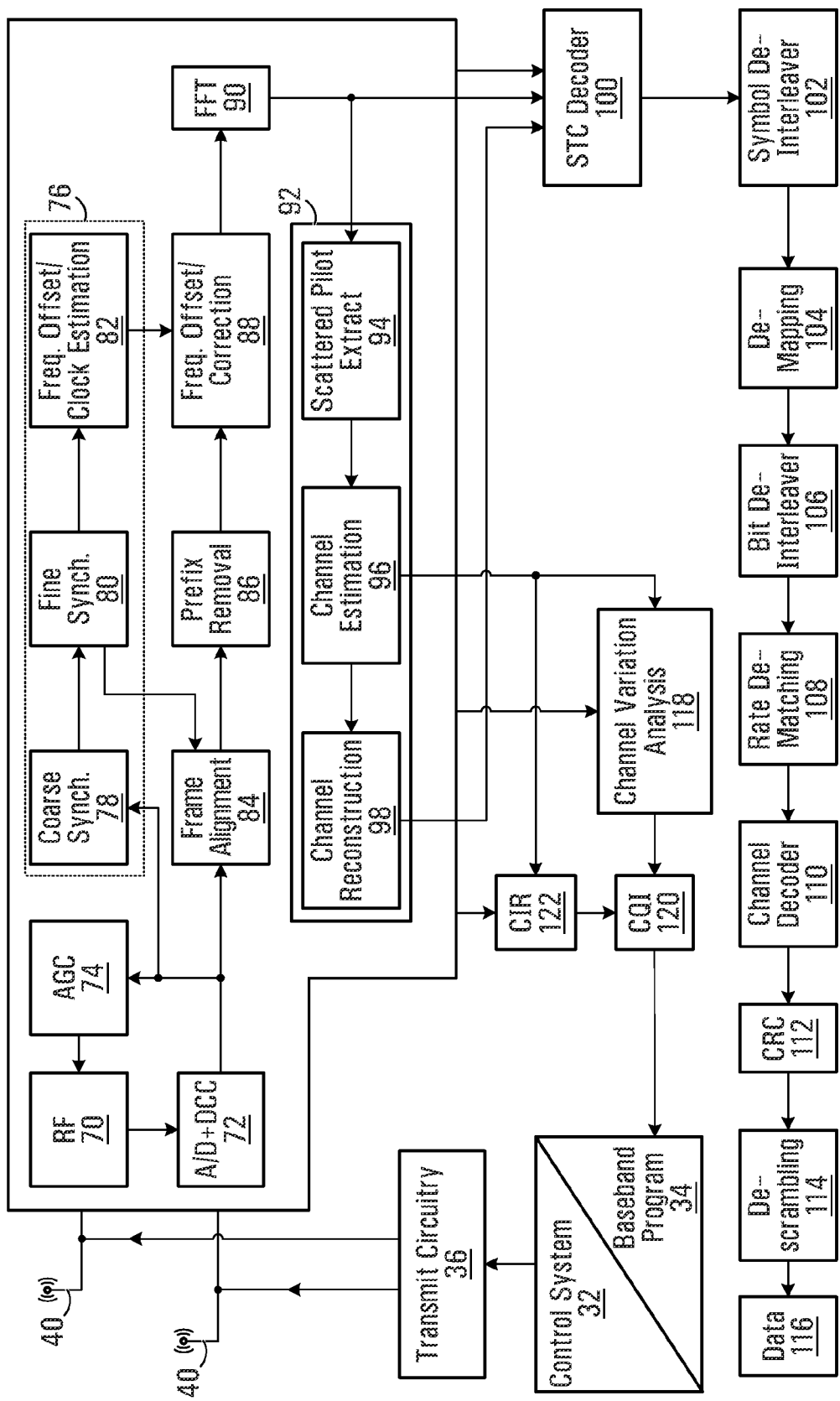
FIG. 6 is a block diagram of a logical breakdown of an example OFDM receiver architecture that might be used to implement some embodiments of the present application.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (AID) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent PET processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using EFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to STC decoder 100 sufficient to remove the effects of the transmission channel when processing the respective frequency domain symbols. The relay station could act as another base station or as a terminal in the context of this invention.

The recovered symbols are placed back in order using symbol de-interleaver logic 102, which corresponds to the symbol interleaver logic 58 of the transmitter. The de-interleaved symbols are then demodulated or de-mapped to a corresponding bitstream using dc-mapping logic 104. The bits are then de-interleaved using bit de-interleaver logic 106, which corresponds to the bit interleaver logic 54 of the transmitter architecture. The dc-interleaved bits are then processed by rate dc-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14 As noted above, the CQI may be a function of the carrier-to-interference ratio (CIR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 1 to 6 provide one specific example of a communication system that could be used to implement embodiments of the application. It is to be understood that embodiments can be implemented with communications systems having architectures that are different than the specific example, but that operate in a manner consistent with the implementation of the embodiments as described herein.

Figure 7:
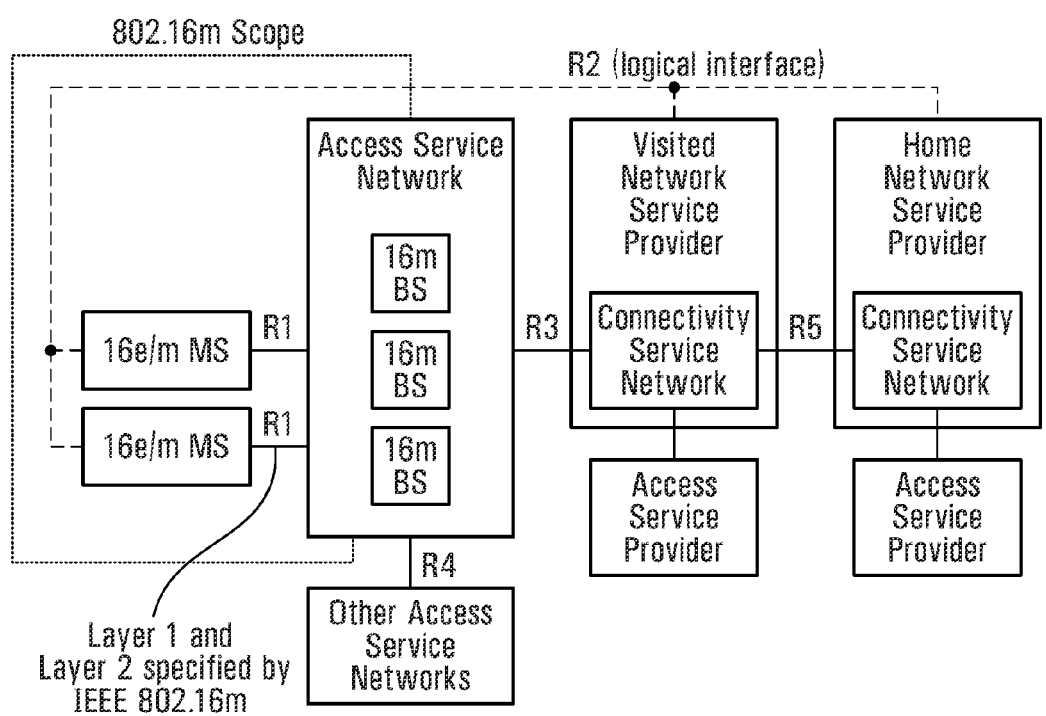
FIG. 7 is a block diagram of an example overall network architecture that might be used to implement some embodiments of the present application.

FIG. 7 is a block diagram illustrating a logical representation of an overall network architecture 700 that might be used to implement some embodiments of the present application. As shown, overall network architecture 700 consists of the following functional entities: mobile stations (MS) 702, access service networks (ASN) 706 comprising base stations (BS) 704 and ASN-gateways (ASN-GW) 705, and a number of connectivity service networks (CSN) 708. Network architecture 700 may be based on the framework defined in WiMAX Network Architecture (The WiMAX Forum Network Architecture Stage 2-3: Release 1, Version 1.2, the entire contents of which are incorporated by reference herein).

ASN 706 may be IEEE 802.16m/e compliant. ASN 706 provides a complete set of network functions needed to provide radio access to an IEEE 802.16e/m subscriber. ASN 706 provides at least the following functions: IEEE 802.16e/m Layer-1 (L1) and Layer-2 (L2) connectivity with IEEE 802.16e/m MS; transfer of AAA messages to IEEE 802.16e/m subscriber's Home Network Service Provider (H-NSP) for authentication, authorization and session accounting for subscriber sessions; network discovery and selection of the IEEE 802.16e/m subscriber's preferred NSP; relay functionality for establishing Layer-3 (L3) connectivity with an IEEE 802.16e/m MS (i.e. IP address allocation); and Radio Resource Management.

In addition to the above functions, for a portable and mobile environment, ASN 706 further supports the following functions: ASN anchored mobility; CSN anchored mobility; paging; and ASN-CSN tunnelling.

Each CSN 708 is a set of network functions that provide IP connectivity services to IEEE 802.16e/m subscriber(s). A given ASN 706 may be shared by more than one CSN 708. A CSN 708 may provide the following functions: MS IP address and endpoint parameter allocation for user sessions; Internet access; AAA proxy or server; policy and Admission Control based on user subscription profiles; ASN-CSN tunneling support; IEEE 802.16e/m subscriber billing and inter-operator settlement; inter-CSN tunneling for roaming; and inter-ASN mobility. A CSN 708 may further comprise network elements (not shown) such as routers, AAA proxy/servers, user databases, Interworking gateway MSs.

Figure 8:
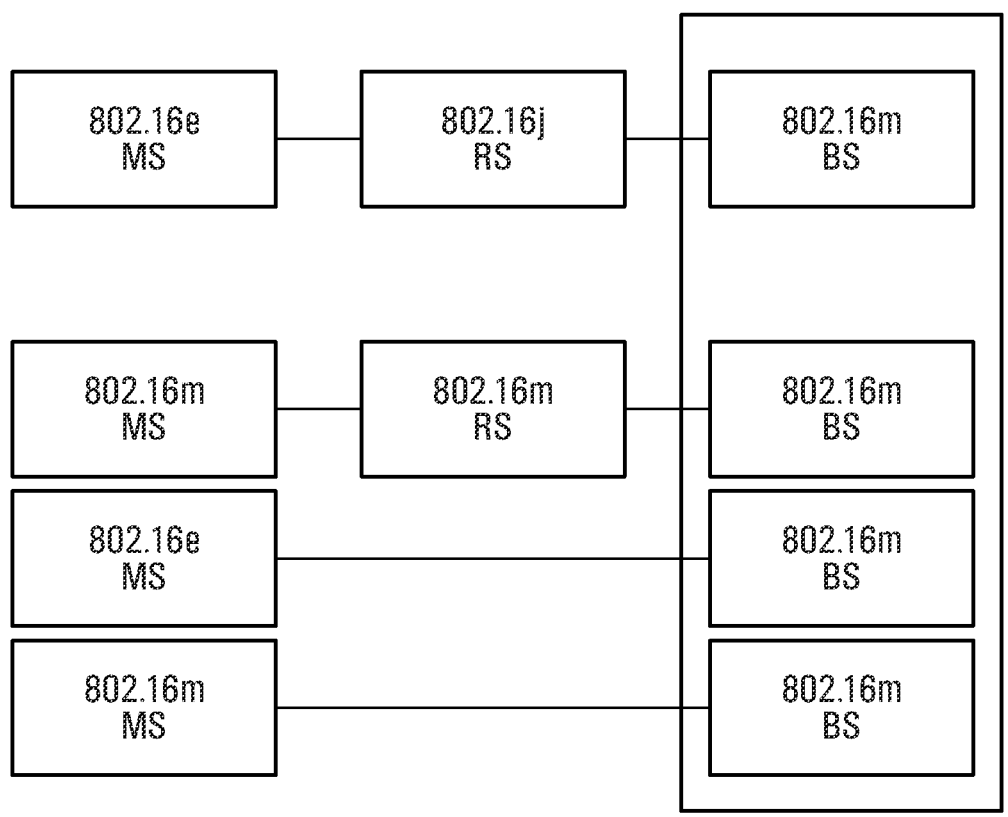
FIG. 8 is a block diagram of a portion of the overall network architecture of FIG. 7.

As shown in FIG. 8, relay stations (RS) 802 may be deployed in the network to provide improved coverage and/or capacity. When RSs 802 are present, communications between a BS 704 and a MS 702 can occur directly or via a RS IEEE 802.16j defines two relay station types according to the number of carriers they can support during relaying:

(1) Single radio relay: A relay station that uses the same carrier frequency as the MR-BS DL/UL carrier for its downlink and UL transmissions, e.g., the MR-BS transmits to the RS at frequency f1 in interval T1, and the RS forwards the signals to its subordinate stations at f1 in interval T2, where T1 and T2 do not have any overlapping period.

(2) Dual-radio relay: A relay station that uses a different frequency from the MR-BS DL/UL carrier for its downlink and uplink transmissions, e.g., the MR-BS transmits to the RS at frequency f1 and the RS forwards the signals at f2 to its subordinate stations.

Note that the above definitions assume TDD operation, that is, the same frequency is being used for both DL and UL communication on any given interface.

Figure 9:
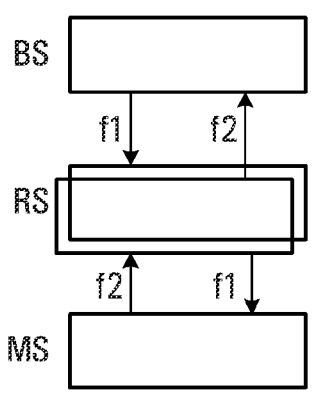
FIG. 9 is a block diagram illustrating the operation of a relay station using two carrier frequencies at half-duplex.
Figure 10:
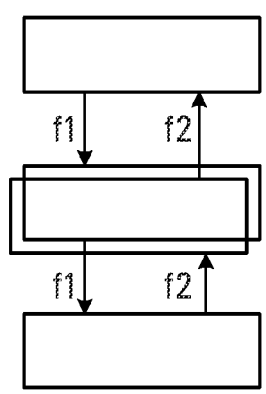
FIG. 10 is a block diagram illustrating the operation of a relay station using two carrier frequencies at full-duplex.

As previously noted, in FDD the UL and DL traffic is transmitted on different carrier frequencies. In accordance with embodiments of the present application, for FDD operation a RS may use the same carrier f1 for its DL transmission that its superordinate station uses for its DL, and the same carrier f2 for its UL transmission that its superordinate station uses for its UL. This option requires two carrier frequencies, and as described in more detail below the frame structure may have to be split into access and relay zones. FIG. 9 illustrates the case where the relay is half-duplex (i.e., it does not receive and transmit simultaneously on a given interface) and the relay operation occurs in a time division fashion. FIG. 10 illustrates the case where the relay is full-duplex (i.e., it receives and transmits simultaneously at the same interface).

Figure 11:
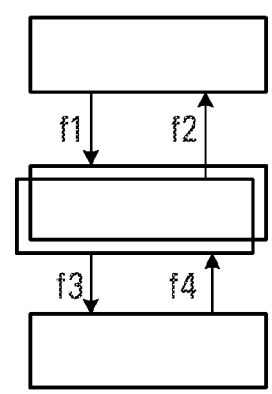
FIG. 11 is a block diagram illustrating the operation of a relay station using four carrier frequencies.
Figure 12:
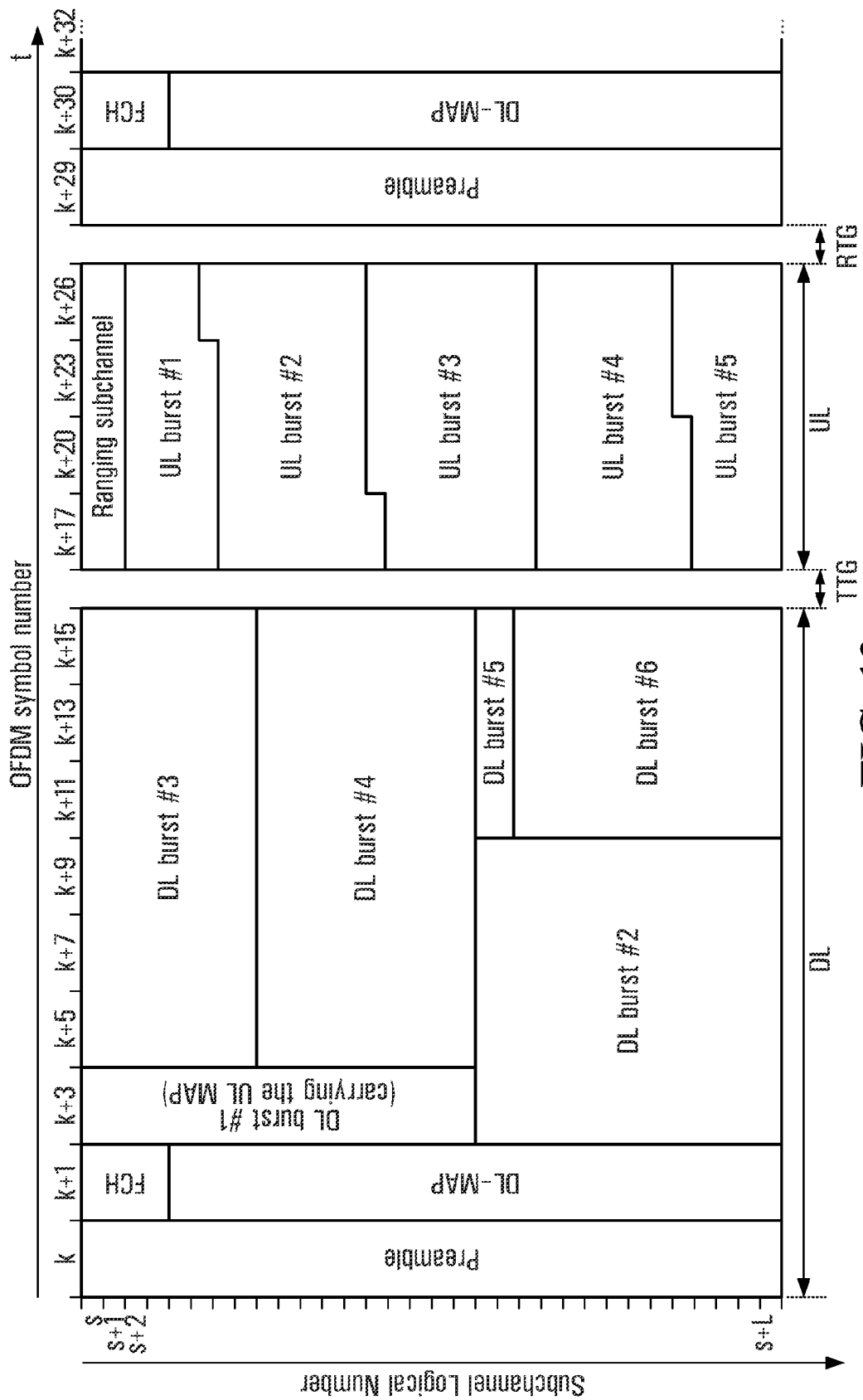
FIG. 12 is a block diagram of an example TDD frame structure.

Alternatively, for FDD operation a RS may use a different DL (UL) frequency from the DL (UL) frequency of its super ordinate station. Note that this option requires 4 carriers (2 for odd hops and 2 for even hops). FIG. 11 depicts this case.

The cases depicted in FIGS. 10 and 11 are similar to each other except that a relay that can operate according to FIG. 10 may require more complex antenna deployment and interference cancellation circuitry for receiving and transmitting simultaneously at the same time at the frequencies. From configuration point of view, they can be treated as being the same.

The relay system depicted in FIG. 9 is more practical in terms of hardware implementation and design, and in addition, the operation suits well to the H-FDD operation already defined in the IEEE 802.16e/Rev2 standard. For example, according to the H-FDD frame structure defined in IEEE 802.16e/Rev2/D6, both DL and UL frames are split into 2 intervals T1 and T2, one for Group 1 MSs/SSs and one for Group 2 MSs/SSs. During T1 (T2) interval, Group 1 (Group 2) MSs/SSs receive the DL signals from the BS, and during T2 (T1) interval, Group 1 (Group 2) MSs/SSs transmit their UL signals to the BS. As described in more detail below, this frame structure may be modified for use in a multi-hop relay network, for example, by inserting the optional relay amble (R-amble), replacing FCH/DL-MAP with R-FCH/R-MAP, etc. In addition, it is also desirable to seek a single-frame approach where more than one relay zone is allowed to appear in a single frame to support FDD multi-hop relay networks. Otherwise, where only one relay zone is allowed to appear in a single frame, multiple frames would be required for multiple relays.

Existing FDD and H-FDD Mode Operation in IEEE 802.16e/Rev2

As specified in IEEE 802.16e/Rev2, parameters related to frame configuration are signalled in DL Channel Descriptor (DCD), UL Channel Descriptor (UCD) and DL-MAP. During network entry, an MS first synchronizes to an available channel and reads DL-MAP1 (FIG. 13) to receive DCD/UCD. Initially, MS performs its ranging operation as part of Group 1. There may be one or two DCD/UCD. If there is one DCD/UCD and the same type/length/value (TLV) is repeated twice, the first one belongs to user Group 1 and the second belongs to user Group 2.

MS receives the length of T1 (T2) interval in the current (next) frame from DL-MAP 1 (DL MAP 2), and the UL carrier frequency from UCD. DCD/UCD provides parameters such as DL_gap size, DL_residue gap size and its location, TTGs and RTGs, etc. so that MS/SS can locate exactly the DL and UL intervals within the frame.

MS performs initial ranging assuming itself in Group 1. BS can switch the MS user group any time by transmitting an H-FDD Group switch Information Element (IE). If the group switch IE is received at frame n, it becomes effective at frame n+switch delay+m, where switch delay parameters is specified in UCD, and m is the group number (e.g., for group 1 user, m=1).

In both FDD and TDD, DL MAP refers to allocations in the current frame while UL MAP refers to a region in the next frame. In H-FDD, the DL MAP 1 or DL MAP 2 refers to a region in the current frame, while UL MAP 1 refers to the next frame, and UL MAP 2 refers to the next-next frame.

If full-duplex and half-duplex MSs operate at the same time, BS can transmit FDD Paired Allocation IE to schedule the full-duplex MSs to all H-FDD resources available. The FDD Paired Allocation IE contains UL MAP IEs that refer to allocations in the other UL region. This IE may also contain a UL Zone Switch IE and a UL Allocation Start IE, in which case those IEs refer to configuration related to the other UL allocation region.

RS and MR-BS Operation in FDD and H-FDD Mode

Figure 13:
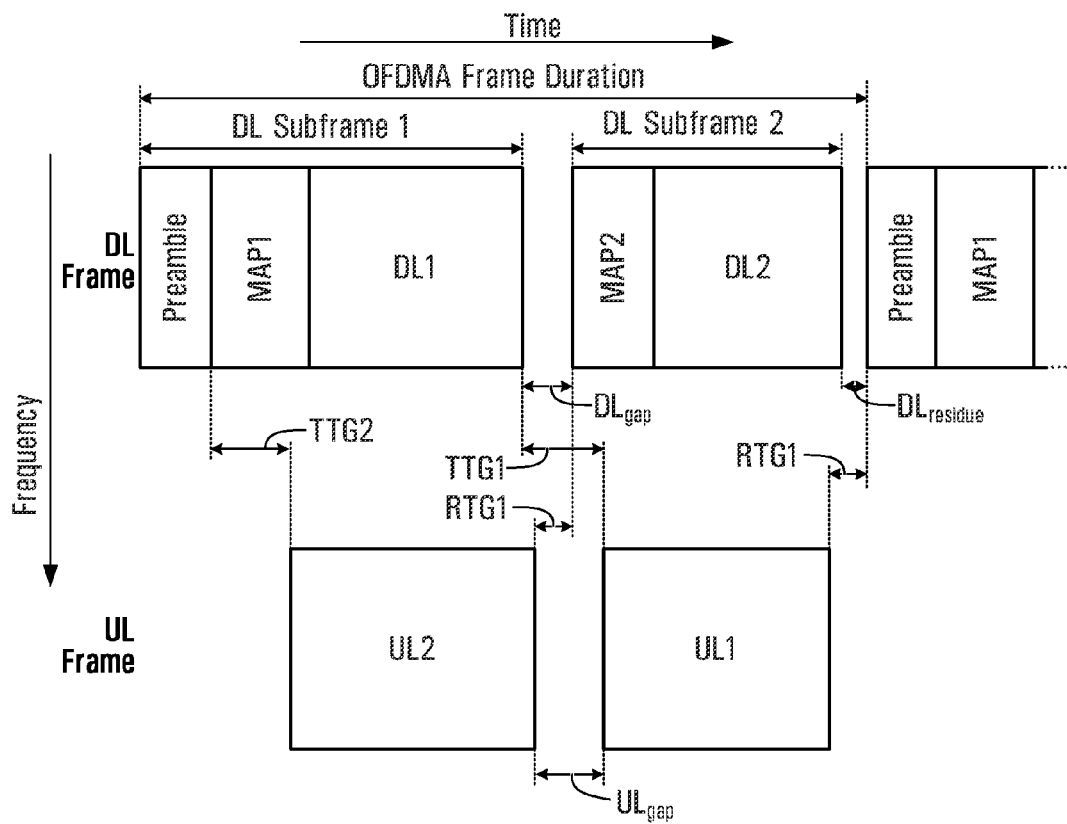
FIG. 13 is a block diagram of an example FDD frame structure.
Figure 14:
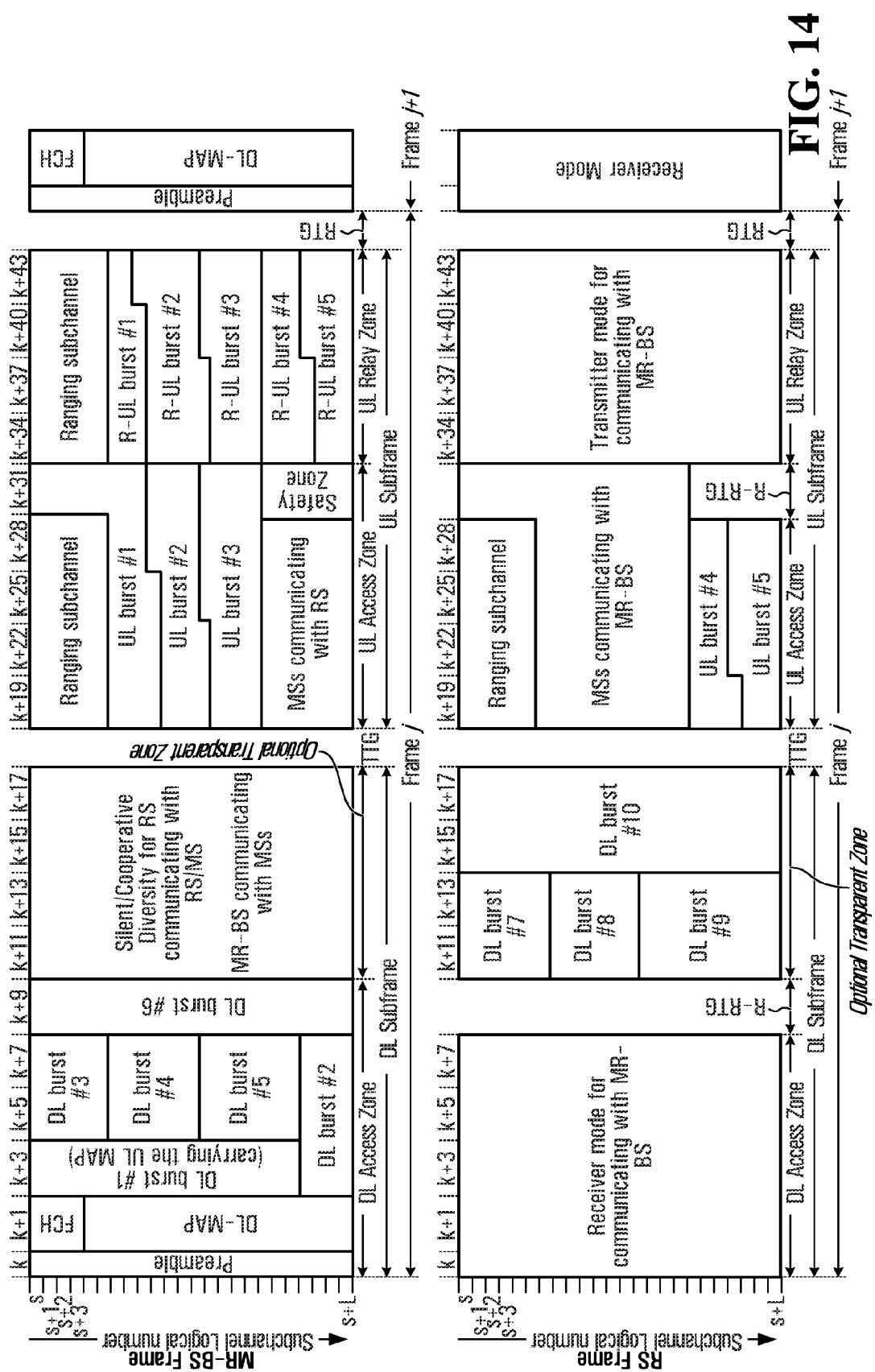
FIG. 14 is a block diagram of an example configuration for a T-RS frame structure.
Figure 15:
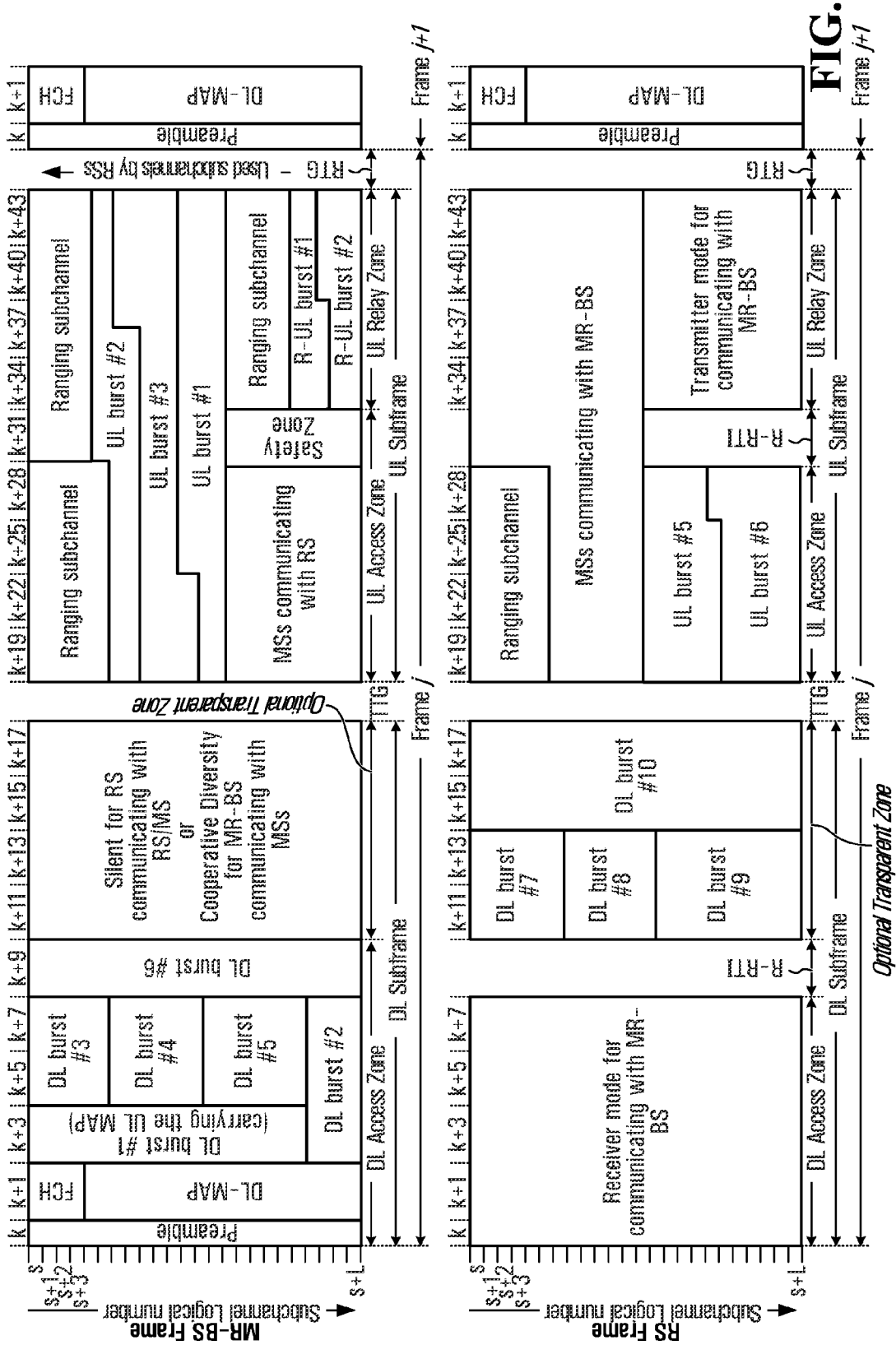
FIG. 15 is a block diagram of an example configuration for a T-RS frame structure in which MR-BS and RS have partitioned the UL subframe in the frequency domain.
Figure 16:
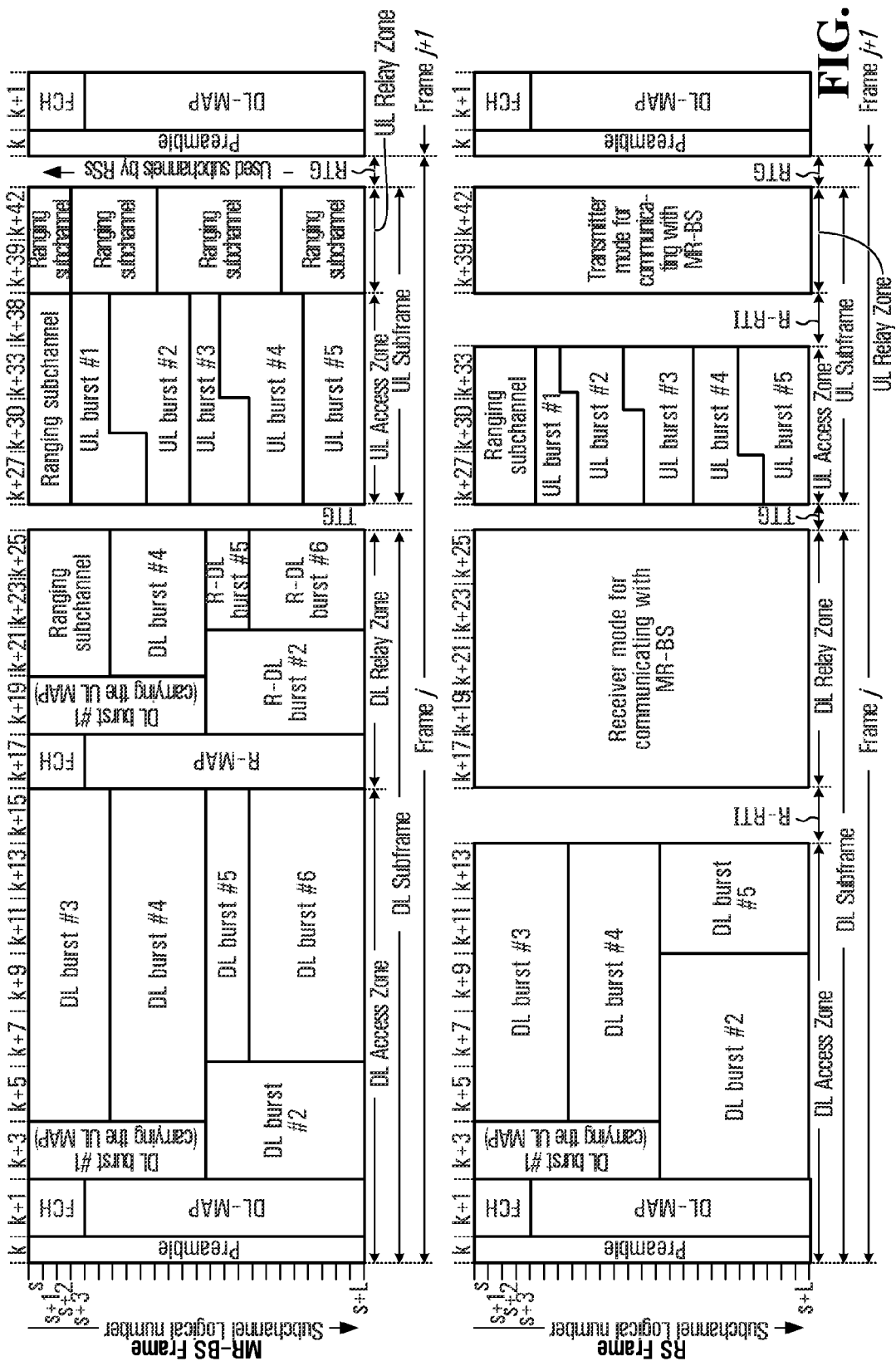
FIG. 16 is a block diagram of an example minimum configuration for a NT-RS frame structure.
Figure 17:
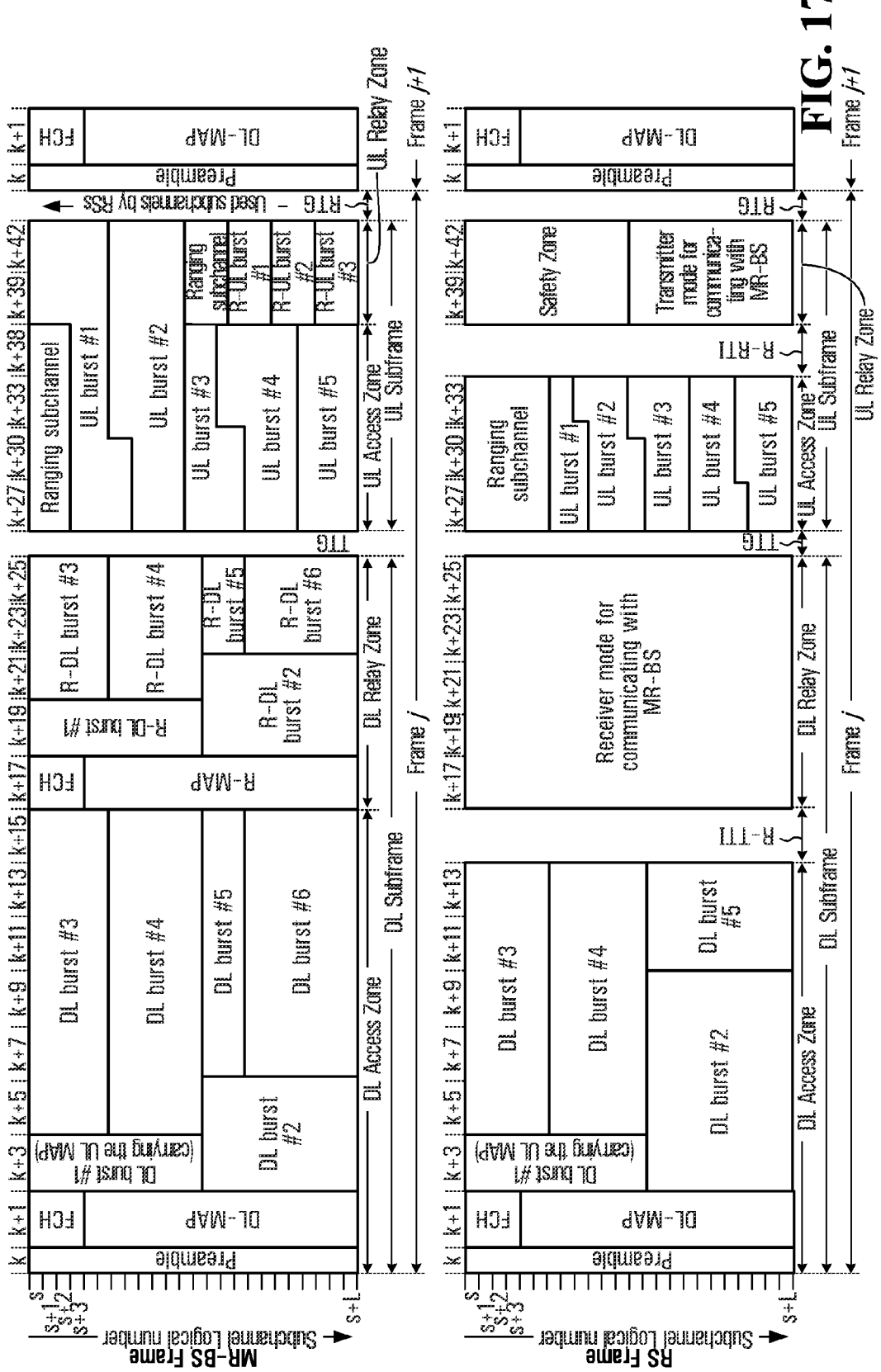
FIG. 17 is a block diagram of an example configuration for NT-RS frame structure where MR-BS and RS have partitioned the UL subframe in the frequency domain.
Figure 18A:
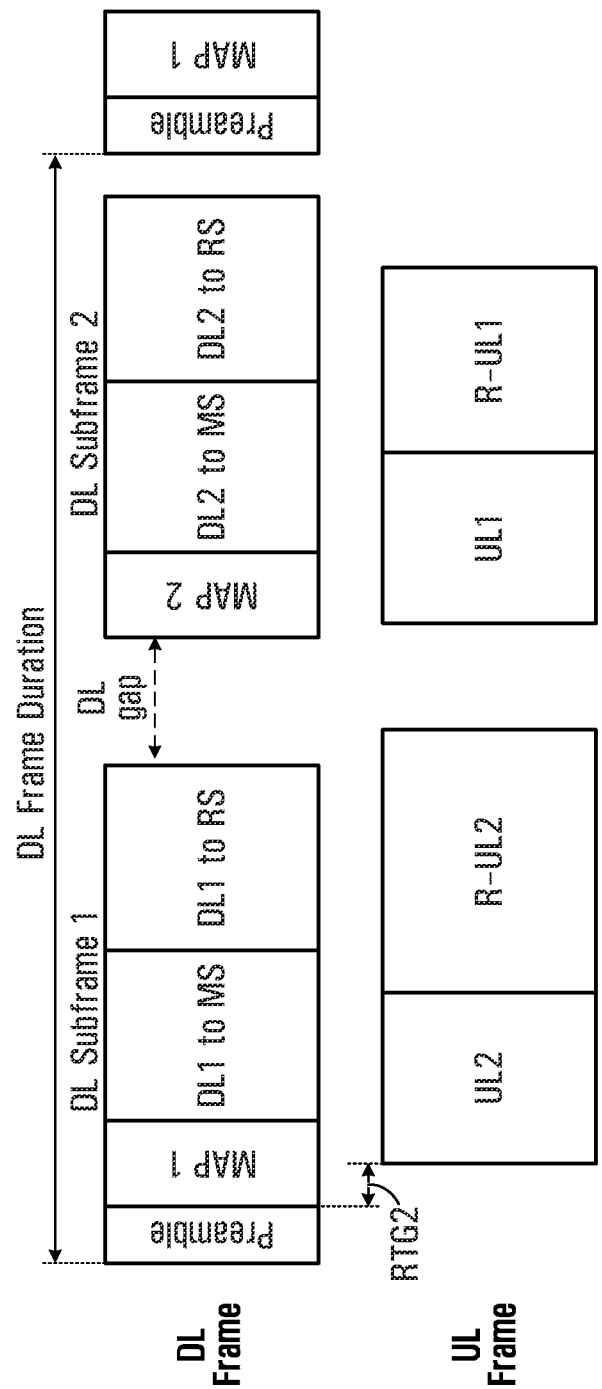
FIGS. 18a, 18b and 18c are block diagrams of example H-FDD frame structures adapted to support multihop relaying.

In accordance with embodiments of the present invention, the FDD frame structure shown in FIG. 13 may be modified to support multihop relaying. As shown in FIG. 18A, the DL1, DL2, UL1 and UL2 subframes may each be divided into two zones in order to support BS-RS and RS-MS communications in addition to BS-MS communications. As with the FDD frame structure of FIG. 13, the frame structure of FIG. 18A supports a coordinated transmission arrangement of two groups of H-FDD stations (Group-1 and Group-2) that share the frame at distinct partitions of the frame.

Figure 18B:
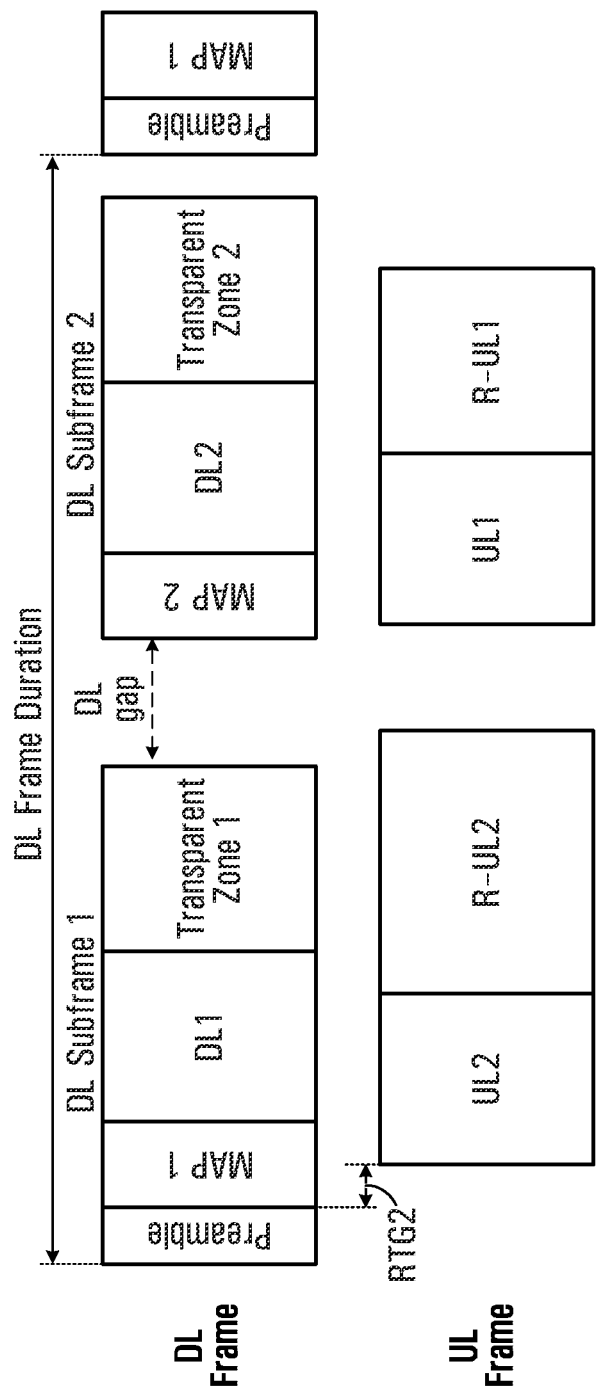

For transparent RS (T-RS) operation, the DL1 and DL2 subframes may each be divided into an access zone and a transparent zone, and the UL1 and UL2 subframes may each be divided into an access zone and a relay zone, as shown in FIG. 18B. A T-RS can be assigned to one of Group-1 and Group-2 in the same way as a MS is assigned. MR-BS can simultaneously assign multiple T-RSs to each Group since T-RSs can be treated as if they are MSs. A T-RS assigned to Group 1 (Group 2) can relay data in the DL1/UL1 (DL2/UL2) regions. For simplicity, all RSs may be assigned to the same Group so that the FCH/MAP for that Group may contain only optional FCH/R-MAP.

Figure 18C:
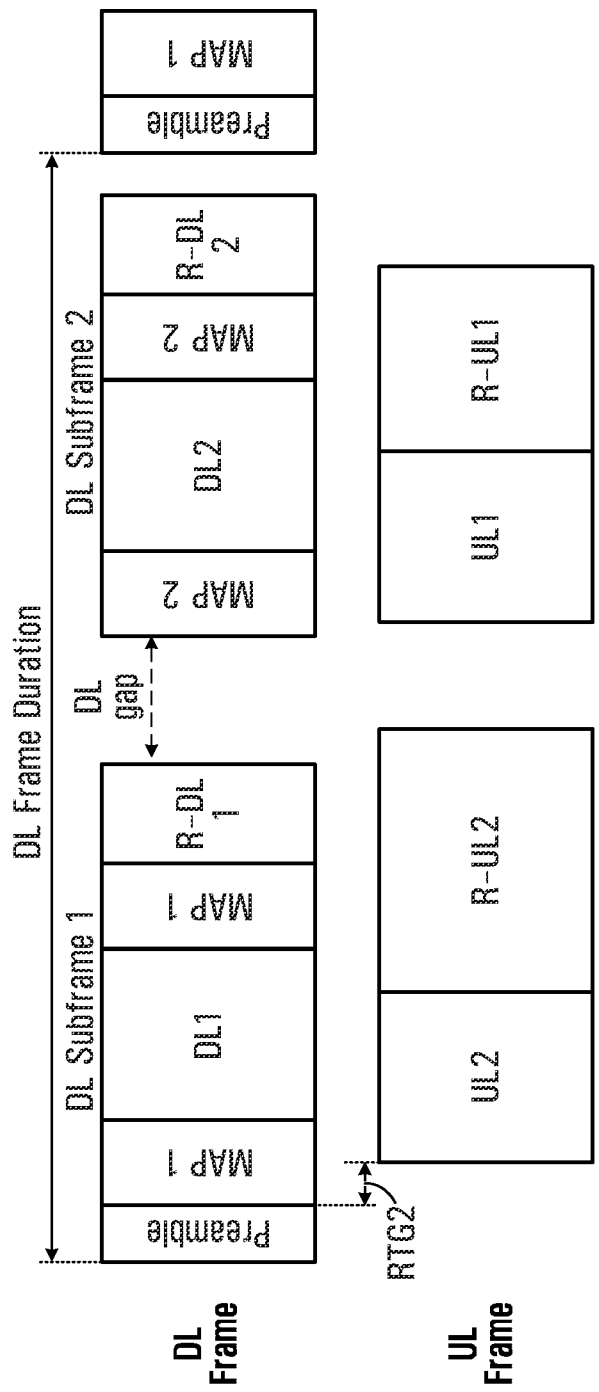

For non-transparent RS (NT-RS) operation, the DL1, DL2, UL1 and UL2 subframes may each be divided into an access zone and a relay zone, as shown in FIG. 18C. A capable NT-RS in Group 1 (Group 2) can use the entire UL zone except for UL1 (UL2).

The R-link Channel Description (RCD) MAC message can be employed to signal the access and relay zones. The access zones may be contiguous and fall within one of the subframes of the H-FDD frame, while the relay zones may be contiguous and fall within the other subframe. The FCH/MAP and R-FCH/RMAP can be transmitted in the first tx access zone and relay zone, respectively.

The RS may obtain the UL carrier from the UCD during network entry. For single radio RSs, the same carrier frequencies used at the first hop may be used at other hops. For dual-radio RSs, the second carrier frequency signalled in the RS Config CMD message can refer to the DL carrier in FDD mode. In FDD mode, an additional TLV may be signalled to configure the UL carrier for RS to use in communicating with subordinate stations.

In non-transparent RS systems, all of the half-duplex MSs/SSs may be set as Group 1 users, and all of the RSs may be set as Group 2 users (or vice versa) in FDD mode. An RS can still operate in full-duplex mode, e.g., it may be allocated resources at all available H-FDD resources via FDD Paired Allocation IE. A transparent RS can monitor both DL MAP 1 and DL MAP 2, and perform relaying according the forwarding rules it has. In systems where all RSs are transparent, MSs/SSs can be switched between groups.

Figure 19A:
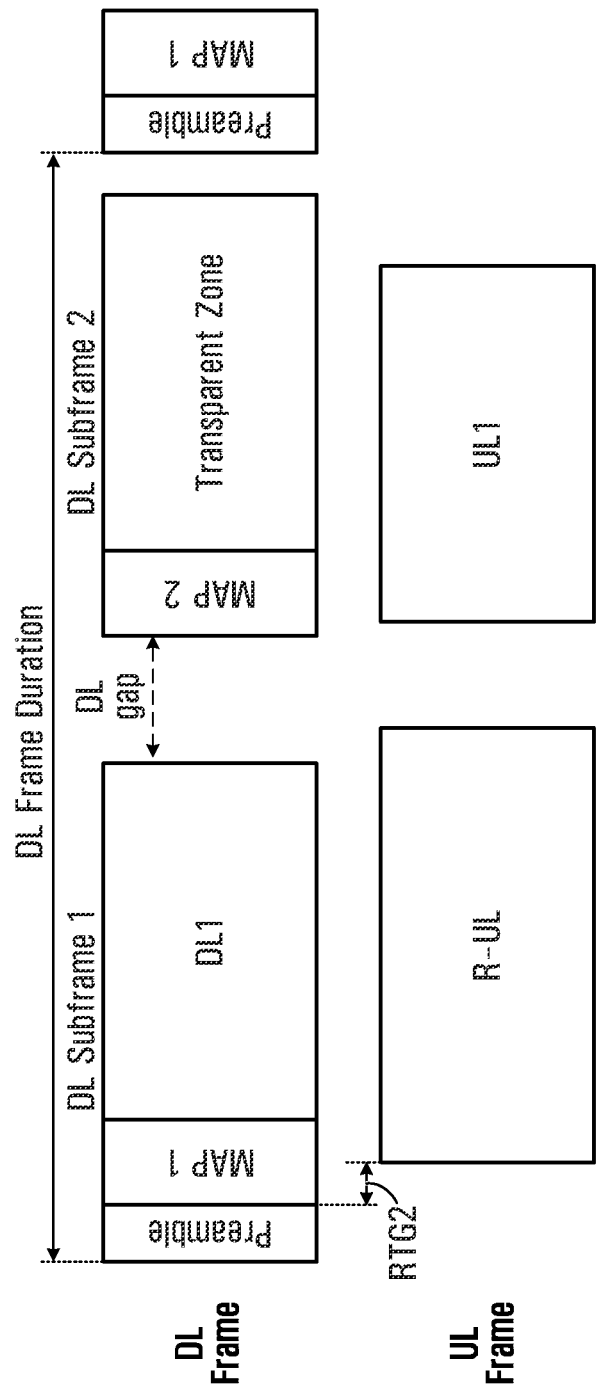
FIGS. 19a and 19b are block diagrams of additional example H-FDD frame structures adapted to support multihop relaying.
Figure 19B:
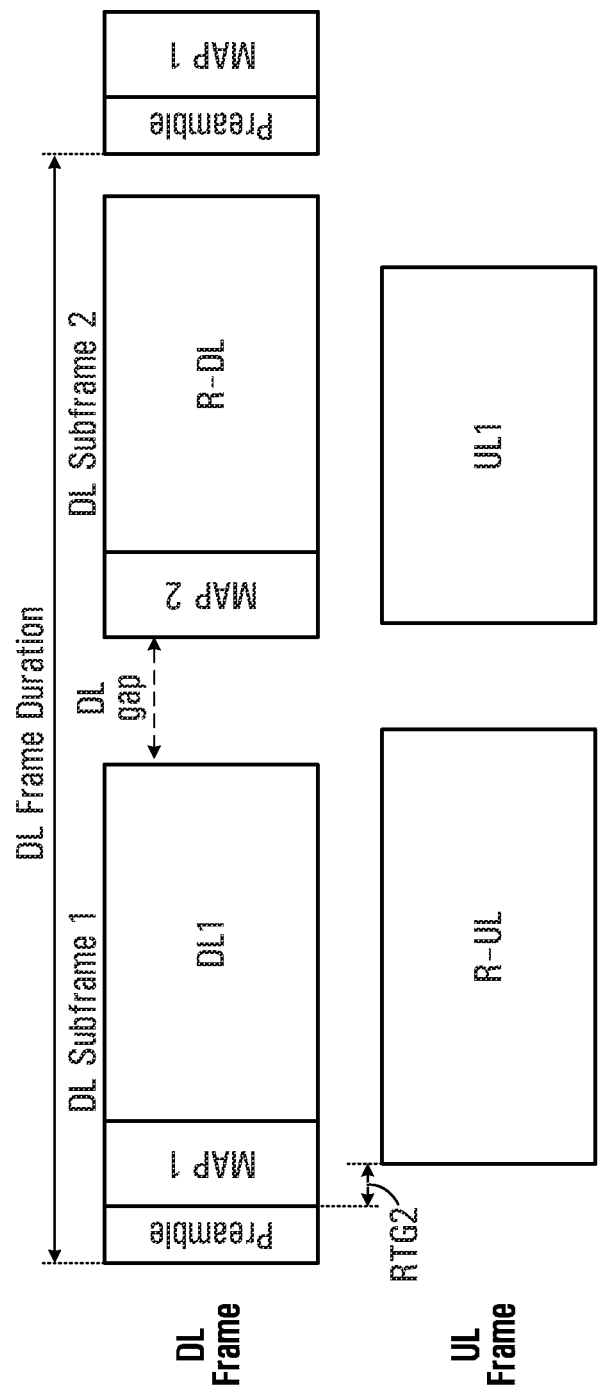

FIGS. 19A and 19B illustrate alternative frame configurations for T-RS and NT-RS operation, respectively, wherein the second subframe of the H-FDD frame structure is used as the transparent zone or the relay zone, as the case may be. That is, rather than divide DL1, DL2, UL1 and UL2 into zones, relays are assigned to only one Group (say, Group 2; i.e. DL2 and UL2, as shown in FIGS. 19A and 19B). For non-transparent RS operation, advantage is taken off the MAP2, since the relay would need its own (R-MAP).

One of the advantages of TDD over FDD is that TDD fits better to the asymmetric characteristics of DL-UL transmissions. The conventional H-FDD frame shown in FIG. 13 assumes only two groups of users, leading to limited flexibility on varying the DL-UL ratio and resulting in about two OFDM symbols being wasted due to the RTG/TRG and/or DL_gap/UL_gap requirement.

Figure 20:
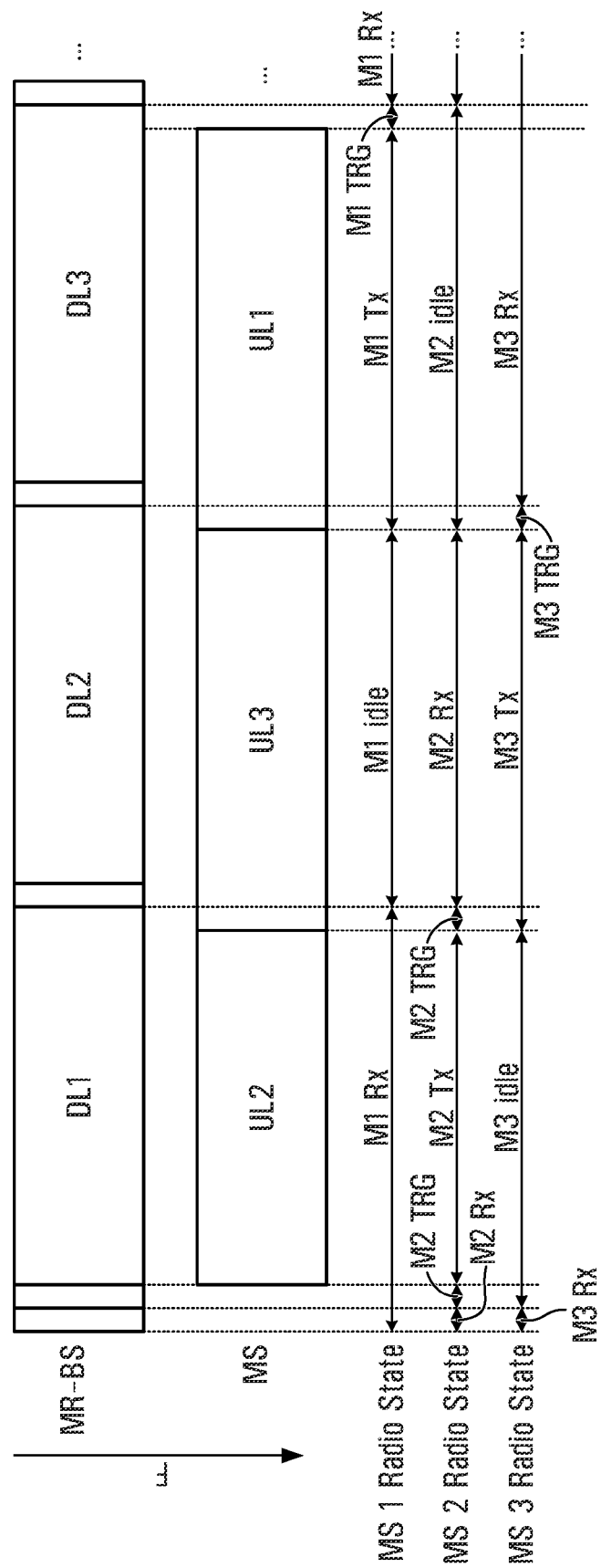
FIG. 20 is a block diagram of an example H-FDD frame structure defining three groups of users with three different regions.

FIG. 20 illustrates an H-FDD frame configuration having three user group regions. As shown, by using three groups of users with three different regions in the frame, the DL_gap/UL_gap requirement may be eliminated, and the RTGs for MS Groups 1 and 3 may be absorbed by their respective radio idle states. It is noted that if TRG, instead of RTG, takes a longer time, by reordering the UL group transmission the TRG for the three MS Groups can be absorbed instead. Flexibility is also gained in varying the DL-UL ratio since radio idle state can be explored.

Figure 21:
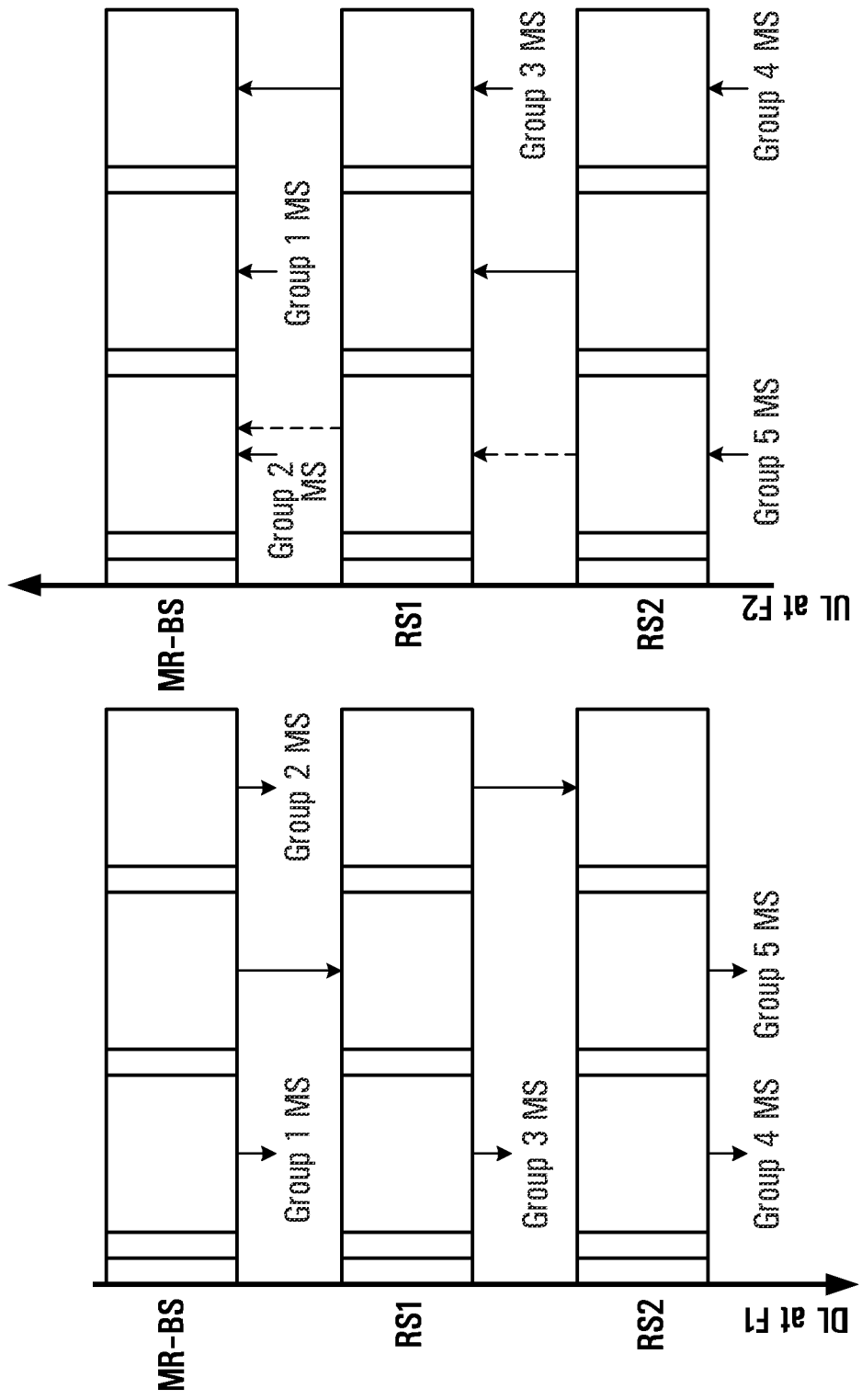
FIG. 21 is a block diagram of an example H-FDD frame configuration for a three-hop case.

FIG. 21 illustrates a three-hop case for the H-FDD frame configuration of FIG. 20. As shown, given more hops more flexibility can be expected, however a higher number of groups of MSs are required.

Other modifications will be apparent to those skilled in the art and, therefore, the invention is defined in the claims.

What is claimed is:

1. A method of operating a relay station in a multihop wireless relay network, said relay station in communication with a superordinate station and a subordinate station, said method comprising:
   receiving a downlink transmission from said superordinate station at a first orthogonal frequency-division multiplexing (OFDM) carrier frequency, the first OFDM carrier frequency being a first central frequency of a first frequency band over which a first OFDM symbol is modulated, wherein the received downlink transmission includes control information;
   receiving an uplink transmission from said subordinate station at a second OFDM carrier frequency, the second OFDM carrier frequency being a second central frequency of a second frequency band over which a second OFDM symbol is modulated, the first central frequency being different than the second central frequency;
   transmitting a downlink transmission to said subordinate station at said first OFDM carrier frequency; and
   transmitting an uplink transmission to said superordinate station at said second OFDM carrier frequency.

2. The method of claim 1, wherein said communication between said relay station and said superordinate station is scheduled using frames, each said frame comprising:
   a downlink portion at said first OFDM carrier frequency, said downlink portion comprising a first downlink subframe for communication between said superordinate station and a first plurality of stations, and a second downlink subframe for communication between said superordinate station and a second plurality of stations; and an uplink portion at said second OFDM carrier frequency, said uplink portion comprising a first uplink subframe for communication between said superordinate station and said first plurality of stations, and a second uplink subframe for communication between said superordinate station and said second plurality of stations;

wherein said first downlink subframe corresponds with a first time interval, said first uplink subframe corresponds with a second time interval, and said first time interval and said second time interval do not overlap; and wherein said relay station is one of said first plurality of stations, whereby said receiving said downlink transmission occurs in said first downlink subframe, and said transmitting said uplink transmission occurs in said first uplink subframe.

3. The method of claim 2, wherein:

said first downlink subframe is divided into a downlink access zone and a downlink transparent zone, and said first uplink subframe is divided into an uplink access zone and an uplink relay zone; and wherein said receiving said downlink transmission occurs in said downlink access zone, and said transmitting said uplink transmission occurs in said uplink relay zone.

4. The method of claim 2, wherein said second uplink subframe corresponds with said first time interval, and said second downlink subframe corresponds with said second time interval.

5. The method of claim 2, wherein said downlink portion comprises a third downlink subframe for communication between said superordinate station and a third plurality of stations, and said uplink portion comprises a third uplink subframe for communication between said superordinate station and said third plurality of stations.

6. The method of claim 5, wherein:

said second uplink subframe corresponds with said first time interval;

said second downlink subframe and said third uplink subframe correspond with a third time interval; and said third downlink subframe corresponds with said second time interval.

7. The method of claim 6, wherein:

said first plurality of stations are in idle state during said third time interval, said second plurality of stations are in idle state during said second time interval, and said third plurality of stations are in idle state during said first time interval; and for each said frame, said first time interval occurs before said third time interval, and said third time interval occurs before said second time interval, whereby respective receive-to-transmit transition gaps for said first and third plurality of stations are absorbed by said respective idle states.

8. The method of claim 5, wherein:

said second downlink subframe corresponds with said second time interval;

said second uplink subframe and said third downlink subframe correspond with a third time interval; and said third uplink subframe corresponds with said first time interval.

9. The method of claim 8, wherein:

said first plurality of stations are in idle state during said third time interval, said second plurality of stations are in idle state during said third time interval, and said third plurality of stations are in idle state during said second time interval; and for each said frame, said first time interval occurs before said second time interval, and said second time interval occurs before said third time interval, whereby respective transmit-to-receive transition gaps for said first and third plurality of stations are absorbed by said respective idle states.

10. A relay station in communication with a superordinate station and a subordinate station in a multihop relay system, the relay station comprising:

receive circuitry for receiving a downlink transmission from said superordinate station at a first orthogonal frequency-division multiplexing OFDM carrier frequency, the first OFDM carrier frequency being a first central frequency of a first frequency band over which a first OFDM symbol is modulated, wherein the received downlink transmission includes control information, and for receiving an uplink transmission from said subordinate station at a second OFDM carrier frequency, the second OFDM carrier frequency being a second central frequency of a second frequency band over which a second OFDM symbol is modulated, the first central frequency being different than the second central frequency; and transmit circuitry for transmitting a downlink transmission to said subordinate station at said first OFDM carrier frequency, and for transmitting an uplink transmission to said superordinate station at said second OFDM carrier frequency.

11. The relay station of claim 10, wherein said communication between said relay station and said superordinate station is scheduled using frames, each said frame comprising:

a downlink portion at said first OFDM carrier frequency, said downlink portion comprising a first downlink subframe for communication between said superordinate station and a first plurality of stations, and a second downlink subframe for communication between said superordinate station and a second plurality of stations; and an uplink portion at said second OFDM carrier frequency, said uplink portion comprising a first uplink subframe for communication between said superordinate station and said first plurality of stations, and a second uplink subframe for communication between said superordinate station and said second plurality of stations;

wherein said first downlink subframe corresponds with a first time interval, said first uplink subframe corresponds with a second time interval, and said first time interval and said second time interval do not overlap; and wherein said relay station is one of said first plurality of stations, whereby said receiving said downlink transmission occurs in said first downlink subframe, and said transmitting said uplink transmission occurs in said first uplink subframe.

12. The relay station of claim 11, wherein:

said first downlink subframe is divided into a downlink access zone and a downlink transparent zone, and said first uplink subframe is divided into an uplink access zone and an uplink relay zone; and wherein said receiving said downlink transmission occurs in said downlink access zone, and said transmitting said uplink transmission occurs in said uplink relay zone.

13. The relay station of claim 11, wherein said second uplink subframe corresponds with said first time interval, and said second downlink subframe corresponds with said second time interval.

14. The relay station of claim 11, wherein said downlink portion comprises a third downlink subframe for communication between said superordinate station and a third plurality of stations, and said uplink portion comprises a third uplink subframe for communication between said superordinate station and said third plurality of stations.

15. The relay station of claim 14, wherein:
said second uplink subframe corresponds with said first time interval;
said second downlink subframe and said third uplink subframe correspond with a third time interval; and
said third downlink subframe corresponds with said second time interval.

16. The relay station of claim 15, wherein:
said first plurality of stations are in idle state during said third time interval, said second plurality of stations are in idle state during said second time interval, and said third plurality of stations are in idle state during said first time interval; and
for each said frame, said first time interval occurs before said third time interval, and said third time interval occurs before said second time interval, whereby respective receive-to-transmit transition gaps for said first and third plurality of stations are absorbed by said respective idle states.

17. The relay station of claim 14, wherein:
said second downlink subframe corresponds with said second time interval;
said second uplink subframe and said third downlink subframe correspond with a third time interval; and
said third uplink subframe corresponds with said first time interval.

18. The relay station of claim 17, wherein:
said first plurality of stations are in idle state during said third time interval,
said second plurality of stations are in idle state during said third time interval,
and said third plurality of stations are in idle state during said second time interval; and
for each said frame, said first time interval occurs before said second time interval, and said second time interval occurs before said third time interval, whereby respective transmit-to-receive transition gaps for said first and third plurality of stations are absorbed by said respective idle states.

* * * * *